Feb. 2, 1960 W. POSCHENRIEDER 2,923,900
ELECTRIC FILTER
Filed April 5, 1956

Inventor:
Werner Poschenrieder.
By
Atty.

United States Patent Office 2,923,900
Patented Feb. 2, 1960

2,923,900

ELECTRIC FILTER

Werner Poschenrieder, Munich, Germany, assignor to Siemens & Halske Aktiengesellschaft, Munich and Berlin, Germany, a corporation of Germany Application April 5, 1956, Serial No. 576,420

Claims priority, application Germany May 9, 1955

5 Claims. (Cl. 333—72)

This invention is concerned with electric filters containing in a transverse branch circuit at least one electromechanically operative element, for example, a piezoelectric element or a magnetostrictive oscillator.

Filters containing electromechanical elements, for example, quartz filters, are generally being used in lattice networks containing in addition a greater or lesser number of complicated reactances. The obtainable relative band width of band passes and band blocks is in such arrangements relatively narrow. Moreover, the stability of the filter is despite the use of electromechanical elements jeopardized on account of the time and temperature dependent alterations in the coils and capacitors employed.

The invention proposes an arrangement employing for the production of a damping pole a resonance in a transverse branch containing at least one electromechanical element, for example, a quartz, and duplicating another resonance in at least one longitudinal branch for similar operation and essentially similar frequency response. The damping pole with the steepest rise flank is thereby determined by the resonance of the transverse branch containing the electromechanical element.

The invention makes it possible to provide ladder type filters for use as high- and low passes as well as band passes and band blocks with practically any width that may be desired.

As compared with known filters in lattice networks containing electromechanical elements, the invention provides improved stability because the steep damping poles are always produced by the resonance, for example of a quartz in the transverse branch, while all elements and therewith all deviations in the damping course enter in lattice networks especially into the damping poles (network balance). The filters according to the invention are above and beyond these advantages considerably simpler; complicated differential repeaters are for example eliminated. In addition, there is obtained simple tuning of the filter and an arrangement which is non-symmetrical to ground.

Figure 1:
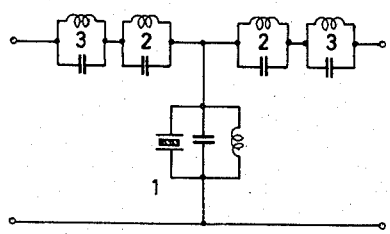
Figure 2:
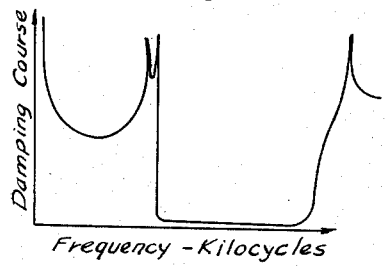

The various objects and features will appear from the description of an example of the invention which is rendered below with reference to the drawing. In the drawing, Fig. 1 shows in schematic manner an example of a circuit of a band pass according to the invention;

Fig. 2 indicates the damping course depending on the frequency; and

Figure 3:
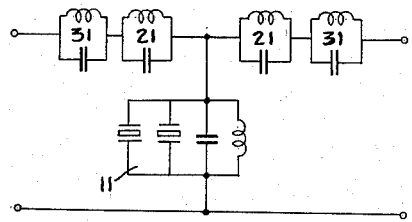

Fig. 3 illustrates a modified T-circuit.

The transverse branch of the ladder type band pass arranged in a T-circuit comprises a quartz, for example, and may in addition comprise other elements, for example, a capacitance connected in parallel with an inductance. The longitudinal branches each contain an inductance and a capacitance connected in parallel as indicated at 2. The arrangement and dimensioning of the elements is for example such that the damping pole determined by the quartz resonance determines the lower limit of the pass range while the neighboring damping pole which is so far as frequency is concerned below such lower limit is determined by the repetition frequency, that is, by the resonance of the quartz branch which is repeated similarly and with the same frequency in the parallel resonance circuits 2 neighboring on the transverse branch. The upper damping pole may be determined (or dispensed with) in usual manner by outer parallel resonance circuits 3 disposed in series with the parallel resonance circuits 2 and in the assumed case, these outer parallel resonance circuits may be in the form of a single coil.

The filter may also be dimensioned so that the damping pole with the steep flank rise, determined by the quartz resonance, may fix the upper limit of the pass range. The outer parallel oscillating circuits may in such a case form one capacitance.

It is moreover possible to fix the lower as well as the upper limits of the pass range by damping poles with steep flank rise, which are determined by a transverse quartz resonance. A further quartz with correspondingly dimensioned resonance is in such case to be disposed in parallel circuit in the transverse branch, as has been illustrated in Fig. 3, wherein the elements 21 and 31 generally correspond to elements 2 and 3 respectively of Fig. 1.

The invention especially contemplates a dimensioning such that upon separation of the ladder type filter shown in Fig. 1 into two elements (one containing in the longitudinal or line circuit two serially connected parallel resonance circuits and being terminated with the parallel circuit comprising the quartz, inductance and capacitance, and the other beginning with the parallel circuit comprising the quartz, inductance and capacitance in the transverse circuit and containing two serially extending parallel resonance circuits in the longitudinal branch) there will result a course Z for the apparent resistance, measured with respect to the side containing the lateral branch, corresponding to the relation $$Z = \frac{\mu \cdot (\omega^2 - \omega_\alpha^2) \cdot \omega}{(\omega^2 - \omega_\beta^2)\sqrt{(\omega^2 - \omega_{-1}^2)\cdot(\omega_1^2 - \omega^2)}}$$

wherein $\mu$ is a constant; $\omega_{-1}$ and $\omega_1$ are limit frequencies, for example, of the pass range; $\omega_\alpha$ is the quartz resonance frequency; $\omega_\beta$ is the repeat frequency.

It is assumed in the embodiment that the band pass is arranged in a T-circuit. It is however also possible to arrange it in accordance with a $\pi$-circuit. For example, there may be on each side a transverse branch each with a quartz and if desired further elements and the longitudinal branch may have two parallel resonance circuits connected in series. The transverse resonance frequencies may thereby be different on the left and right so as to result in two different damping poles with steep rise, which limit the pass range of the filter upwardly and downwardly. The parallel resonance circuits in the longitudinal branch, directly neighboring on the transverse branches, thereby are to be dimensioned so that they repeat a resonance frequency of the neighboring transverse branch similarly and substantially with the same frequency.

It is entirely possible to provide a quartz band filter of several elements wherein parallel disposed quartzes need not be reciprocal as to frequency. Nor is it absolutely necessary that the resonance frequency of the coil poles corresponds exactly to the parallel resonance of the transverse branch; relatively slight deviations are permissible. Plural electrode quartz means may be advantageously employed.

In describing the embodiment, it has been assumed that quartzes are used. Magnetostrictive elements may take the place of quartzes in corresponding circuits. It is likewise possible to use quartzes or other piezoelectric elements and also magnetostrictive elements.

It may be of advantage, for reasons of easily realizing the invention, to use in the interior of the filters in known manner conversion elements, especially capacitive conversion means.

For the purpose of reducing capacitance, the quartzes should only be partially coated with electrodes. The elements used should advantageously be likewise made with low capacitance.

Changes may be made within the scope and spirit of the appended claims.

I claim:

1. An electrical ladder-type broad band pass filter comprising at least one transverse branch containing an electro-mechanical oscillating element, and at least one longitudinal branch containing a parallel resonance circuit, said electro-mechanical oscillating element having a series resonance which causes such element to produce a damping pole with a steep damping characteristic, said parallel resonance circuit in said longitudinal branch having a resonance frequency which is substantially the same as the frequency of a parallel resonance in said transverse branch which contains said electro-mechanical oscillating element.

2. An electric band pass filter according to claim 1, arranged in T-circuit, the transverse branch of said circuit containing a series resonance including at least one piezoelectric element, wherein one damping pole with steep flank rise is determined by the transverse branch containing said piezoelectric element while another damping pole is determined by the repeat frequency in the resonance circuit in said longitudinal branch.

3. An electric band pass filter according to claim 1, arranged in T-circuit, comprising a transverse branch having a resonance circuit containing at least one piezoelectric element, wherein one damping pole with steep flank rise is determined by the transverse branch containing said piezoelectric element while another damping pole is determined by the repeat frequency in the resonance circuit of said longitudinal branch, the arrangement being such that upon separation into two elements, there will result for the course of the apparent impedance Z, measured with respect to the transverse branch, the relation $$Z = \frac{\mu \cdot (\omega^2 - \omega_\alpha^2) \cdot \omega}{(\omega^2 - \omega_\beta^2)\sqrt{(\omega^2 - \omega_{-1}^2) \cdot (\omega_1^2 - \omega^2)}}$$

wherein $\mu$ is a constant; $\omega_{-1}$ and $\omega_1$ are limit frequencies of the pass range; $\omega_\alpha$ is the quartz resonance frequency; and $\omega_\beta$ is the repeat frequency.

4. An electric band pass filter according to claim 1, arranged in T-circuit, comprising a transverse branch having a resonance circuit containing at least one piezoelectric element, wherein one damping pole with steep flank rise is determined by the transverse branch containing said piezoelectric element while another damping pole is determined by the repeat frequency in the resonance circuit of said longitudinal branch, and a second parallel connected piezoelectric element in said transverse circuit, the arrangement being such that the damping poles with steep rise in the frequency range determining respectively the pass and the blocking range are fixed with respect to the upper and lower frequency limits.

5. An electric filter according to claim 1, arranged in $\pi$-circuit, wherein the resonance frequencies of transverse branches containing piezoelectric elements differ so as to produce damping poles respectively determining the pass and the blocking ranges.

References Cited in the file of this patent

UNITED STATES PATENTS

| | | |
|---|---|---|
| 1,808,524 | Byrnes | June 2, 1931 |
| 1,921,035 | Mason | Aug. 8, 1933 |
| 1,967,250 | Mason | July 24, 1934 |
| 1,969,571 | Mason | Aug. 7, 1934 |
| 2,094,044 | Mason | Sept. 28, 1937 |
| 2,170,206 | Mason | Aug. 22, 1939 |
| 2,222,417 | Mason | Nov. 19, 1940 |
| 2,266,658 | Robinson | Dec. 16, 1941 |
| 2,814,021 | Oswald | Nov. 19, 1957 |